United States Patent
Sledz et al.

(10) Patent No.: US 10,033,620 B1
(45) Date of Patent: Jul. 24, 2018

(54) PARTITIONED PERFORMANCE ADAPTIVE POLICIES AND LEASES

(71) Applicant: EMC Corporation, Hopkinton, MA (US)

(72) Inventors: Dan Sledz, Seattle, WA (US); Jonathan Walton, Seattle, WA (US); Daniel Powell, Seattle, WA (US); Anton Rang, Houlton, WI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 14/870,165

(22) Filed: Sep. 30, 2015

(51) Int. Cl.
  *G06F 15/16* (2006.01)
  *H04L 12/26* (2006.01)
  *H04L 29/08* (2006.01)
  *H04L 12/911* (2013.01)

(52) U.S. Cl.
  CPC .............. *H04L 43/18* (2013.01); *H04L 47/70* (2013.01); *H04L 67/06* (2013.01); *H04L 67/1097* (2013.01)

(58) Field of Classification Search
  CPC ......... H04L 43/18; H04L 47/70; H04L 67/06; H04L 67/1097
  USPC .................................................. 709/203–248
  See application file for complete search history.

(56) References Cited

U.S. PATENT DOCUMENTS

| | | | |
|---|---|---|---|
| 7,633,898 B2 * | 12/2009 | Jain .......................... | H04W 8/08 370/328 |
| 7,702,739 B1 * | 4/2010 | Cheng ..................... | H04L 47/10 709/203 |
| 9,226,130 B2 * | 12/2015 | Nylander ................ | H04W 8/08 |
| 9,712,401 B2 * | 7/2017 | Wright ................ | H04L 41/5022 |
| 2013/0003591 A1 * | 1/2013 | Novak ................ | H04W 72/085 370/252 |
| 2016/0197834 A1 * | 7/2016 | Luft .................... | H04L 12/4641 709/223 |

* cited by examiner

*Primary Examiner* — Moustafa M Meky
*Assistant Examiner* — Thorne E Waugh
(74) *Attorney, Agent, or Firm* — Krishnendu Gupta

(57) ABSTRACT

Implementations are provided herein for offering partitioned performance within a distributed file system; specifically, for providing adaptive policies and leases within the partitions. An amount of resources available to a cluster of nodes operating as a distributed file system can be determined and those resources can be apportioned to individual nodes based on hardware profiles of the nodes. A set of resource accounting tokens can be dynamically updated and used as a basis to generate a cluster resource accounting aggregate, a set of node resource accounting aggregates, and a set of protocol resource accounting aggregates. The dynamically updated resource accounting aggregates can then be used to dynamically throttle resource available to process work requests at the cluster, node, and protocol head layers based on policy.

15 Claims, 17 Drawing Sheets

| TOKEN SPECIFICATION | ZONE | LOCAL IP | USER ID | GROUP ID | PROTOCOL | SHARE | CLIENT IP | NODE |
|---|---|---|---|---|---|---|---|---|
| ZONE | X | | | | | | | |
| LOCAL IP | | X | | | | | | |
| PROTOCOL | | | | | X | | | |
| CLIENT | | | X | | | | X | |
| NODE | | | | | | | | X |
| USERS | X | | | | X | | X | |
| PROJECT | X | | | | X | X | | |
| FILE / DIRECTORY | | | | | | | | |
| OPERATION | | | | | | | | |

FIG. 2

| DATA DESCRIPTION | RESOURCE CATEGORY | DATA |
|---|---|---|
| TIME SERIES OF RESOURCE CONSUMPTION | CONSUMPTION TIME | |
| BYTES IN | NETWORK BANDWIDTH | |
| BYTES OUT | NETWORK BANDWIDTH | |
| MBUFS, MBUF CLUSTERS, MBUF BYTES | NETWORK BANDWIDTH | |
| DISK POOL ID | DISK ACTIVITY | |
| BACKEND IO | DISK ACTIVITY | |
| CACHE IO | DISK ACTIVITY | |
| CPU THREAD USAGE | CPU | |
| MEMORY USAGE | MEMORY | |

| RAA FOR USER JOE – TIME: A-D | | |
|---|---|---|
| RAT | TIME PERIOD | NODE 1 USAGE |
| XXX1 | A | 20% |
| XXX9 | A | 39% |
| X134 | C | 2% |
| X167 | D | 50% |
| X180 | D | 12% |

| RAA FOR USER JOE – TIME: A-D | | |
|---|---|---|
| RAT | TIME PERIOD | CLUSTER USAGE |
| XXX1 | A | 12% |
| XXX2 | A | 5% |
| XXX9 | A | 23% |
| XX37 | B | 50% |
| XX45 | C | 4% |
| X134 | C | 1% |
| X167 | D | 25% |
| X180 | D | 6% |
| X245 | D | 10% |

600

PARTITIONED PERFORMANCE ADAPTIVE POLICIES AND LEASES

CROSS REFERENCE TO RELATED APPLICATIONS

This application is related to co-pending U.S. patent application Ser. No. 14/870,151 for PARTITIONED PERFORMANCE: TRACKING CORE RESOURCE CONSUMPTION INDEPENDENTLY and filed concurrently herewith, which is incorporated herein by reference for all purposes; to co-pending U.S. patent application Ser. No. 14/870,159 for PARTITIONED PERFORMANCE ADAPTIVE PREDICTED IMPACT and filed concurrently herewith, which is incorporated herein by reference for all purposes; to co-pending U.S. patent application Ser. No. 14/870,167 for PARTITIONED PERFORMANCE: USING RESOURCE ACCOUNT AGGREGATES TO THROTTLE AT THE GRANULAR LEVEL and filed concurrently herewith, which is incorporated herein by reference for all purposes; and to co-pending U.S. patent application Ser. No. 14/585,939 for DYNAMIC CROSS PROTOCOL TUNER, which is incorporated herein by reference for all purposes.

FIELD OF THE INVENTION

This invention relates generally to partitioned performance in a multi-protocol, multi-node, distributed file system environment, and more particularly to systems and methods for tracking core resource consumption independently.

BACKGROUND OF THE INVENTION

Distributed file systems offer many compelling advantages in establishing high performance computing environments. One example is the ability to easily expand, even at large scale. Another example is the ability to support multiple unique network protocols. For example, a cluster of nodes operating together to function as a distributed file system can support connections from clients using different network protocols. One storage client can access the distributed file system using the Network File System ("NFS") protocol, a second using the Server Message Block ("SMB") protocol, and the third using the Hadoop Distributed File System ("HDFS") protocol. Not only can different clients access the distributed file system using different protocols, multiple clients of a single protocol can also access the distributed file system.

With the ability to service multiple protocols, and to service hundreds and in some implementations thousands of clients, competition for resources can occur. In addition, beyond client traffic, internal jobs such as file system maintenance also compete for distributed file system resources. One means to slow down the consumption of resources within a distributed file system is to throttle network traffic to and from clients and the file system. However, strictly examining and throttling network traffic may not provide an accurate view of the amount of resources clients are consuming. In addition, while throttling individual users can free up resources for other users or internal processes, it may not be desirable to the user or an administrator who wishes to prioritize one set of file system traffic versus another.

As the distributed file system grows in cluster size, a similar growth in the number of clients and workflows typically also occurs. However, the expectations of individual users remain unchanged, in that users expect adequate performance from the cluster of nodes in performing their workflows. Therefore there exists a need to estimate the impact of current workloads and new workloads to assess the impact on the distributed file system, and allow an administrator or an automated process to manage the performance provided to multiple workflows in a way that provides adequate performance for most if not all users.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of hardware and network resources available to process work items in a cluster of nodes as distributed file system can be determined. The set of hardware and network resources can be apportioned to nodes among the cluster of nodes based on a set of node hardware profiles. A set of resource accounting tokens ("RATs") can be dynamically updated wherein RATs in the set of RATs are associated with at least one of an access zone identifier, a user identifier, a group identifier, a protocol, a client internet protocol address, and a node identifier. A cluster resource accounting aggregate ("RAA") can be dynamically generated based on the set of RATs. A node RAA can be dynamically generated for each node in the cluster of nodes based on the set of RATs. A set of protocol RAA for a set of protocol heads supported by the distributed file system can be dynamically generated wherein the set of protocol heads includes at least SMB, NFS, HDFS, and a job engine protocol.

In accordance with another aspect, a cluster level throttling limit can be established. The cluster RAA can be dynamically monitored. In response to the cluster RAA exceeding the cluster level throttling limit, work requests received by the cluster can be dynamically throttled based on a cluster throttling policy.

In accordance with another aspect, a node level throttling limit can be established for nodes among the cluster of nodes. The node RAA for each node in the cluster of nodes can be dynamically monitored. In response to the node RAA exceeding the node level throttling limit, work requests received by the node can be dynamically throttled based on a node throttling policy.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 2 illustrates an example set of resource accounting token specifications in accordance with implementations of this disclosure;

FIG. 4 illustrates an resource accounting token in accordance with implementations of this disclosure;

FIG. 6 illustrates an example resource accounting aggregate in accordance with implementations of this disclosure;

DETAILED DESCRIPTION

Figure 1:
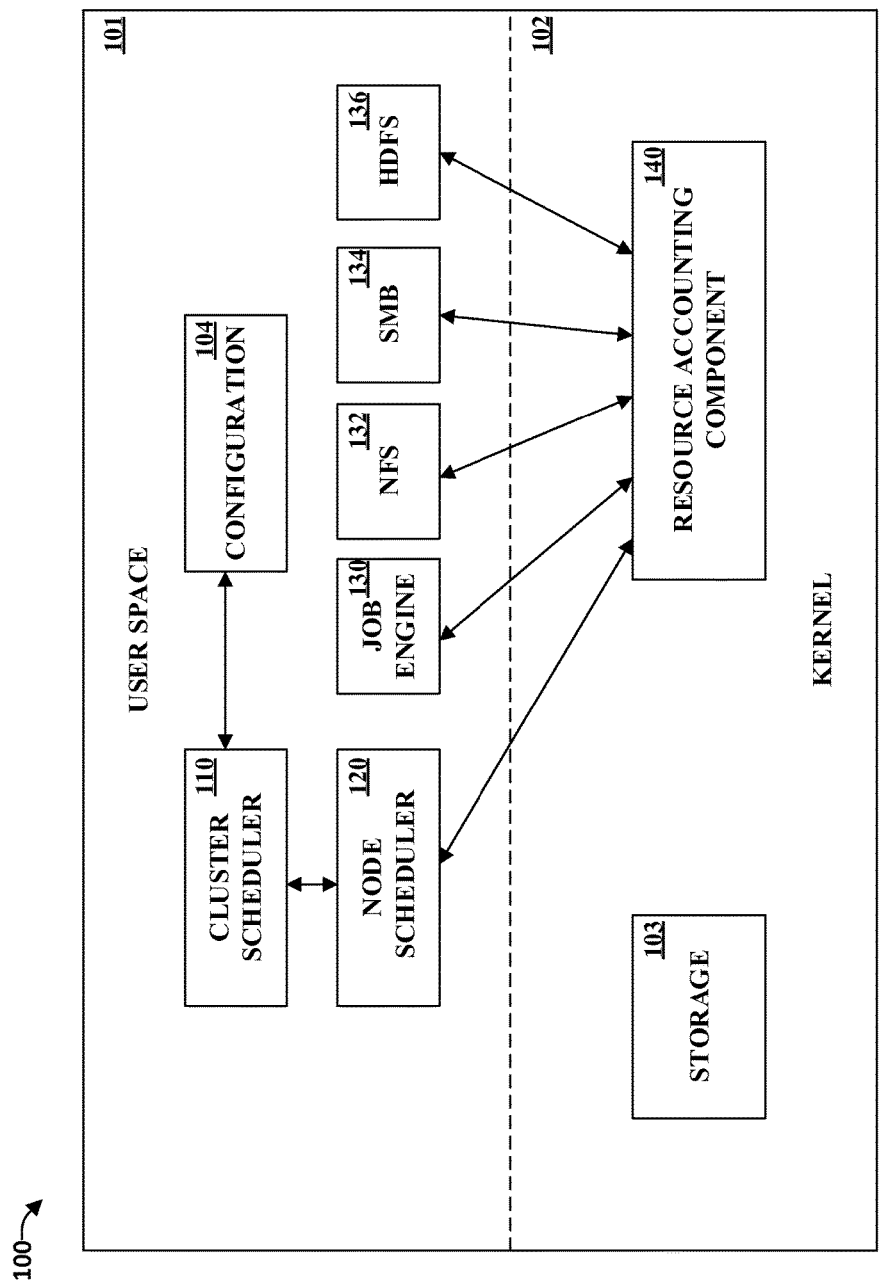
FIG. 1 illustrates an example block diagram of resource accounting in relation to the kernel and user space in an operating system in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "Access Zone" as used within this specification refers to a form of multi-tenancy that effectively partitions a single file system into trees that can act like distinct separate file systems to connected clients. Different access zones can have separate overlapping root directories, and can be affiliated with a distinct protocol. It can be appreciated that an admin access zone can be established for the root directory of the entire file system that can encompass all other access zones of the file system. In some implementations, only the root directory exists as an access zone. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various implementations, non-resident clients may communicate to the nodes in a cluster through high-latency, relatively low-bandwidth front side network connections, such as Ethernet, or the like. In at least one of the implementations, non-resident clients may communicate to the nodes in a cluster through a high-bandwidth, low latency front side interconnect.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that store copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes. Implementations herein also refer to clusters of nodes being in contact with differing cluster of nodes. It can be appreciated that separate clusters of nodes are responsible for separate namespaces and have differing inode data, even if the clusters store the same data.

The term "scheduler" can refer to a gateway at the cluster level, the node level, or the protocol head level, that schedules work items to be processed as received from both clients and internal file system processes. The scheduler has awareness of what work items are currently being processed as well as a list of pending work items to process. In one implementation, if the demand is higher than the current cap for the protocol head, node, or cluster, then the work item that is pending can be discarded and the client can be instructed to resend the request after a period of delay. In one implementation, the scheduler can put a pending work item into a waiting queue until it has available resources to schedule the work item to be processed. It can be appreciated that discard requests should be attempted to be minimized as it is not desirable to significantly delay a client's requests and it is further desirable to maintain transparency to the client in how tasks are scheduled. In one implementation, the rate at which client requests are read from the network connection can be throttled. It can be appreciated that by throttling the rate at which client requests are read from the network connection, backpressure on the connection can be induced and can be detected by the client.

The term "job engine" refers to a component within the distributed file system that manages automated processes such as file system maintenance, file system data services, and non-client initiated work items. The job engine can queue work items similar to how a protocol head queues work items received by protocol clients.

Implementations are provided herein for providing partitioned performance within a distributed file system. In one implementation, a cluster of nodes can provide estimates of the resources required to process pending workflows. For example, compute resources, memory resources, network resources, and disk resources can all be estimated. In one implementation, resources provided to workflows can be throttled based on work item estimates and a throttling policy. In one implementation, the file system can adaptively monitor the predicted impact of workflows and the actual impact of workflows to revise future estimates of the same workflows or predict the impact of new workflows. In one implementation, a detailed accounting of all workflow activity within the file system can be provided and allow an administrator or an automated process to create custom aggregate accountings. In one implementation, workflows can be monitored, accounted for, and throttled at multiple layers of the distributed file system including at the cluster layer, the node layer, and the protocol head layer. In one implementation, a policy engine can be established to control the throttling of resources at each layer of the file system.

Referring now to FIG. 1, there is illustrated an example block diagram of resource accounting in relation to the kernel and user space in an operating system in accordance with implementations of this disclosure. Resource accounting component 140 exists within the kernel 102 to provide auditing information of actual resources used inside the core file system to process work items. It can be appreciated that this can provide a more detailed accounting versus residing outside the core file system in the client level. For example, typical quality of service accountings at the client level can provide the network bandwidth used by the client; however, the bandwidth the client uses does not discriminate into how it was generated. For example, two clients could both use the same bandwidth at the network connection level; however, their activity within the file system may account for large disparities in resources consumed in performing their workflows. It can be appreciated that by locating the resource accounting component 140 within the kernel layer, central processing unit ("CPU") utilization, disk operations, and memory usage can all be tracked at a fine grain level. In one example, a user could make 8 reads of 20 KB packets of data, which may consume far more file system resources than 1 read of a 160 KB packet of data. If just the network traffic were analyzed, these two sets of transactions would look the same; however, internal to the file system, the resource accounting component 140 can track the actual resources consumed for each work item being processed.

The cluster scheduler 110 can provide a single cluster scheduler to coordinate traffic between individual nodes of the cluster of nodes. Each node can have a node scheduler 120 that can coordinate along with individual protocol schedulers (e.g., job engine 130, network file system ("NFS") scheduler, server message block ("SMB") scheduler, Hadoop distributed file system ("HDFS") scheduler, etc.). It can be appreciated that other protocols can be supported beyond what's depicted in FIG. 1 including hypertext transfer protocol ("HTTP"), file transfer protocol ("FTP"), object orient protocols such as simple object access protocol ("SOAP"), Representational State Transfer ("REST"), and protocols specific to the Open Stack project such as Open Stack Swift, Open Stack Manila, etc. In addition, other than protocol access, other file system activity occurring outside the bounds of a protocol head can be tracked including the reference job engine that includes file system administration and maintenance tasks as well as local access to the file system such as direct access via a command line interface.

In some implementations, a single client can connect to multiple nodes and submit work items to those nodes for processing. The cluster scheduler 110 and the protocol schedulers (e.g., 130, 132, 134 and 136) can be aware of cross-node activity by a single client and account for the total amount of cluster resources used by the client that spans multiple nodes. In some implementations, a single user can connect to multiple nodes and multiple protocol heads and a cluster scheduler 110 can account for the resources consumed by the single user across nodes and protocol heads.

Referring now to FIG. 2, there is illustrated an example set of resource accounting token specifications in accordance with implementations of this disclosure. Resources are accounted to various actors, objects, and processes using a base resource accounting token ("RAT"). Individual RATs are maintained for every layer of accounting within the partitioned performance system. For example, RATs can be maintained for each Access Zone within the file system, each local internet protocol ("IP") address service by the file system, each individual protocol within the file system, each client accessing the file system, each node of the cluster of nodes, each user of the file system, groups of users within the file system, to a specific project being undertaken by users or automated processes of the file system, individual files and/or directories of the file system, individual operations processed by the file system, etc. Thus, for every work item processed by the file system, the partitioned performance system should be aware of which RATs need to be accounted to in processing the work item.

For example, when a work item is processed, a resource record is generated that accounts for the actual resources used when processing the work item. The contents of the resource record are described with more specificity in relation to FIG. 4. However, after generating the resource record, the file system would need to know which RATs need to account for the resources used (e.g., the resources accounted for in the resource record). For example, a work item that is being processed in Access Zone 24, for user "Joe" using the SMB protocol for Project "Beta" would need to have the resources actually consumed when processing the work item be eventually accounted for in the RATs associated with Access Zone 24, user identifier "Joe", protocol SMB, etc.

In one implementation, resources can be accounted through the use of a resource accounting token specification. A resource accounting token specification can be created to account for a single field or multiple fields of interest that the partitioned performance system is customized to collect. An example of a single field token specification is shown in FIG. 2 as a Zone specification that accounts resource records based on the access zone associated with the operations. In an example of a multiple field token specification, a "users" token specification can account resource records to a set of RATs associated with access zone, user identifier, a protocol, and a client IP address associated with each relevant resource record. As shown in FIG. 2, some blank rows (2 shown) exist for custom token specifications as they are customizable and can be configured by an administrator or an automated process to include a combination of the columns that delineate known discriminative information about operations when processed. In addition, some blank columns (1 shown) exist to account for additional discriminative information that can be associated with resource records at the time of generation that can also be customized by an administrator or an automated process. For example, the row for file/directory can require information such as the inode associated with a work item and thus an administrator could add an inode column as another piece of tracked data associated with each work item so that a "File/Directory" token specification can account for resources consumed at the file/directory level. Similarly for an operation, the type of operation associated with each work item can be accounted for, tracked, and associated with a set of RATs based on the operation. It can be further appreciated that token specifications for single fields for known discriminative data on work items can be automatically generated such as the Zone, Local IP, Protocol, Client IP, and Node examples as depicted in FIG. 2. In one implementation, individual resource accounting token specifications can be assigned unique identifiers for easy reference by the partitioned performance system.

Figure 3:
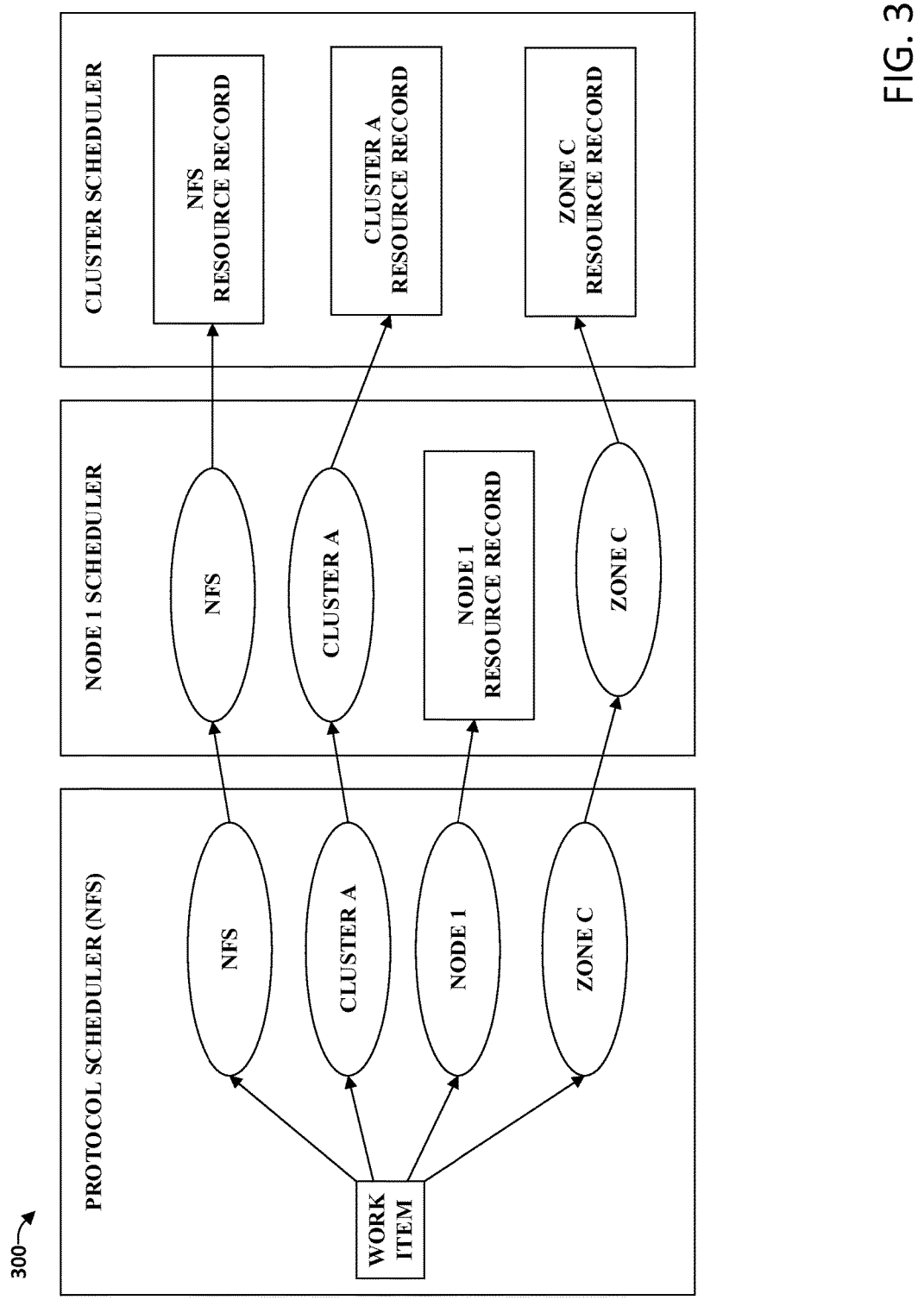
FIG. 3 illustrates an example block diagram of resource accounting blocks involved in processing a work item in accordance with implementations of this disclosure.

Referring now to FIG. 3, there is illustrated an example block diagram of resource accounting blocks involved in processing a work item in accordance with implementations of this disclosure. FIG. 3 relates to the interaction between resource records and the three schedulers of the distributed file system: the protocol layer scheduler, the node layer scheduler, and the cluster layer scheduler. As described in more detail with regard to FIG. 7, the protocol layer, the node layer, and the cluster layer are the three layers where throttling can be proscribed and accomplished by the associated layer's scheduler.

The depicted work item is first described by the protocol scheduler as being an NFS operation in cluster A, on node 1, in access zone c. While each Node has an individual scheduler particular to the node, the protocol scheduler and the access zone accountings exist at the cluster layer, since they are aggregated across all nodes of the cluster. Therefore, the resource record flows from the protocol scheduler to the node 1 scheduler where the resource record can be established for Node 1. The resource record can then flow to the cluster scheduler where it can be ascribed to a global NFS RAT, a global cluster A RAT, and a global zone C RAT. It can be appreciated that the resource records depicted in FIG. 3 relate strictly to the schedulers and the resource record generated by the work item can flow to other RATs not depicted such as to RATs associated with user identifiers, group identifiers, operation type, etc.

Referring now to FIG. 4, there is illustrated a sub resource accounting token in accordance with implementations of this disclosure. As stated above, RATs contain the actual resource accounting information. A RAT can be distributed across several nodes and processes. A parent RAT is the RAT referred to in the resource accounting token specification, and can be assigned a unique non-repeating cluster wide unique identifier. The parent RAT is the root of a tree from which flows sub RAT's that contain the active accounting information. Thus, the root RAT or parent RAT is the aggregate of all child RATs. RATs support accounting over a fixed time period, thus, sub RATs exist for fixed time periods.

The sub RAT depicted in FIG. 4 shows a resource record that contains a set of resources consumed as accounted for in the resource record. The sub RAT can be associated with the fixed time period during which the resources were consumed, as correlated with a global time stamp of the file system.

A consumption time category can account for the time series of resource consumption (e.g., the amount of time it took to process the operation the resource record reflects).

A network bandwidth category can account for a number of bytes in, a number of bytes out, and a set of data associated with mbufs. Mbufs is a basic unit of memory management in the kernel that stores network packets and socket buffers. A network packet can span multiple mbufs arranged in an mbuf cluster. Mbufs, mbuf cluster and mbuf bytes can all be tracked because there may be limits placed on the size of mbufs and mbufs clusters; however, mbuf bytes can account for those limits. For example, if the mbuf is limited in size by bytes to 2048 bytes, each mbuf could contain anywhere between 1 to 2048 bytes; however, by including a field of mbuf size, the partitioned performance system can know with specificity how large the mbuf is. The network bandwidth category can also track a packet count.

A disk activity category can track disk input/output ("IO"). Each disk in a distributed file system is a member of a single disk pool. The disk pool ID can be determined for each IO including IO associated with the various levels of the cache (e.g., L2 cache, L3 cache). A backend IO can track all disk request that go through the backend (e.g., the backplane connecting the nodes of a cluster of nodes that reflects traffic between nodes). It can be appreciated that each node may not host data locally that is necessary to complete the work item. For example, a read request may be served by Node 1 relating to data stored on Node 2. In this example, Node 1 may initiate a request to Node 2 to read data from Node 2 into Node 1, creating backend IO between the nodes. Each IO request through the backend is associated with a disk pool that serviced the request, and this can be recorded in the resource record and eventually into the sub RAT. Cache IO can identify whether disk IO was skipped due to the data being present in either L2 or L3 cache memory. For each cache, a disk pool ID can be assigned, and if the cache is used the cache IO can identify the usage. For example, if the cache is used in prefetching the data, the appropriate cache disk pool ID can be charged for the usage.

A CPU category can track the CPU usage per-thread. For example, the CPU usage of a thread can be sampled at the start and stop of processing the work item and the data can be recorded into the resource record. In one implementation, each thread processing the work item will initialize per-thread accounting via a shared memory page. This page can be updated with resource totals during execution, and on completion, can be combined.

A memory resource category can track the total memory usage for each work item in both userspace and kernel.

RATs can be tallied and aggregated for any of the fields described in FIG. 2 to create a resource accounting aggregate ("RAA"). For example, dimensions of RATs can be partitioned together into interested groups or buckets based on the interest of an administrator or as proscribed by an automated process of the file system. A bucket of specific RATs becomes an RAA. In one example, an RAA could be all transactions related to a single protocol or a subset of protocols. In another example, an RAA could be all transactions related to a single user. In still another example, all transactions related to an Access Zone or a specific IP address can be RAAs. RAAs can be predetermined and automatically generated to provide relevant discriminative information on-demand.

Some additional examples of predetermined RAA's can be the percentage of total resources consumed by write operations, percentage of total resources consumed by NFS protocol operations, percentage of total resources consumed by the job engine, the percentage of total bandwidth being consumed by a specific user, etc.

Figure 5:
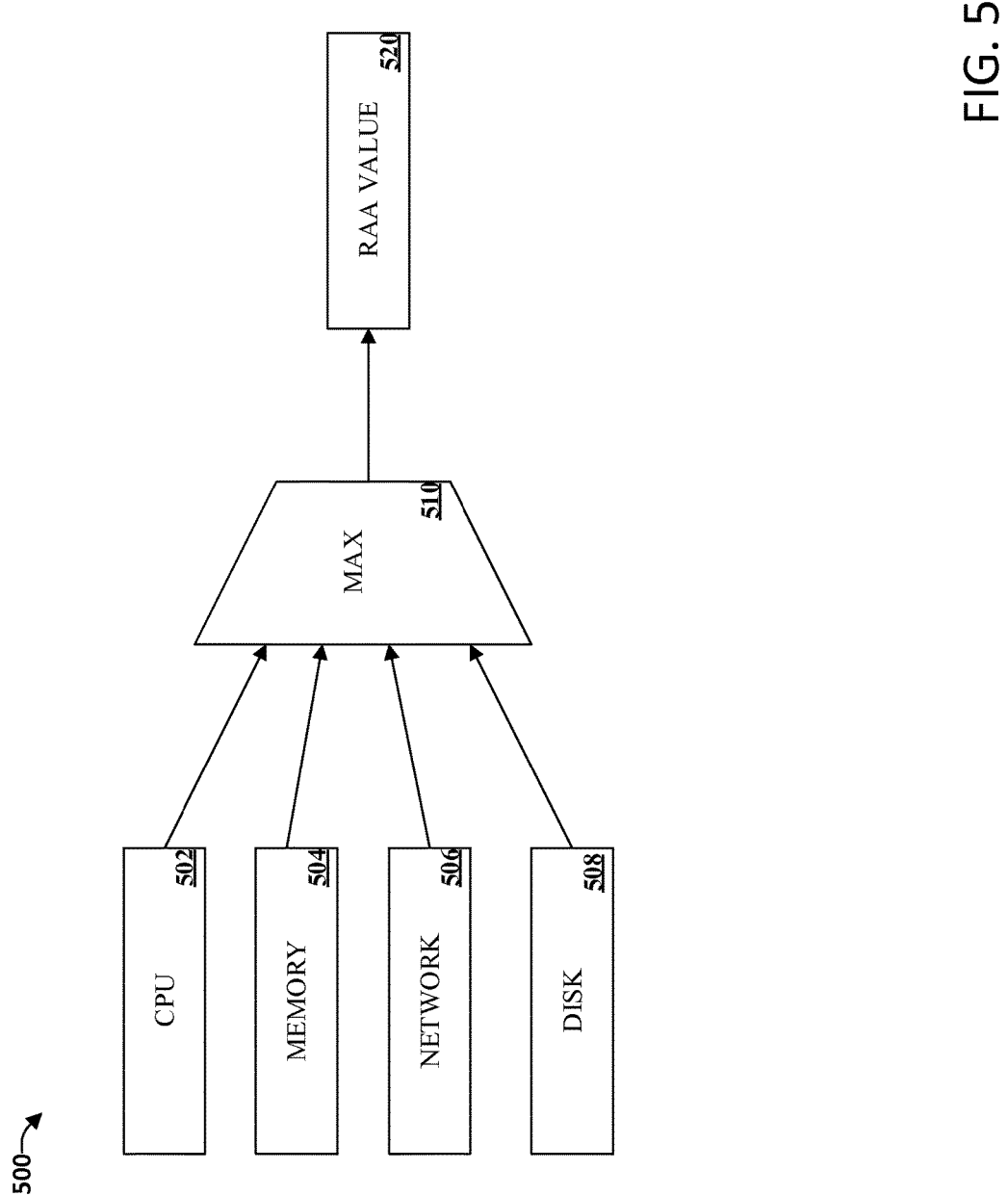
FIG. 5 illustrates an example block diagram for computing a resource accounting aggregate in accordance with implementations of this disclosure.

Referring now to FIG. 5, there is illustrated an example block diagram for computing a resource accounting aggregate in accordance with implementations of this disclosure. While an RAA limits the amount of RATs from the global RAT table that are aggregated into a smaller data set, sub processes can then limit their intake of a RAA to a further aggregate of information. As depicted in FIG. 5, a base RAA contains the CPU 502, Memory 504, network activity 506 and disk activity 508 that are aggregated based on a set of RATs as determined by the RAA. A Max filter 510 can then be applied to the RAA fields to give a single aggregate RAA value 520 that just describes the max value from any of the RAA fields. For example, if a RAA describes a set of work items that are heavy on CPU usage but consume far less network resources, the RAA value would reflect the high CPU usage. It can be appreciated that to correlate CPU values with memory values, the categories must first be normalized to a common scale. In this example, the common scale can be a percentage of overall resources used. It can be appreciated that other methods of normalizing to a common scale can be used. The amount of overall resources can be based on the amount of total cluster resources, an amount of total node resources, or an amount of total protocol resources. It can be appreciated, as described more fully with respect to FIG. 7 below, that the total amount of resources available at each layer can reflect a throttle cap placed on the layer by a throttle policy engine. For example, the max value could be based on the percentage of NFS resources then allocated by the throttle policy engine to the NFS protocol head.

Referring now to FIG. 6, there are illustrated example resource accounting aggregates in accordance with implementations of this disclosure. The RAAs are associated with a specific User, Joe. The time periods for the RAAs are from consecutive time periods A through D. As discussed above, an RAA is an aggregate of a set of RATs. The set of RATs for the RAA depicted in FIG. 6 are denoted by the RAT identifier. As each RAT identifier is associated with a parent RAT, the time period will help determine the sub RAT applicable for the specific time period. Compiling multiple sub RATs over the same time period, allows the RAA to aggregate RATs from separate work items into an aggregate of all of User Joe's activity. The usage column can identify the max value as described in FIG. 5 for each RAT over the specified time period. It can be appreciated that the usage percentage can be based on cluster usage, node usage, or protocol head usage as configured by the RAA. In the depicted examples, a cluster usage RAA is tracked whereby Joe used an aggregate of 40% of the cluster resources in time period A, 50% of cluster resources during time period B, 5% of cluster resources during time period C, and 41% of cluster resources during time period D. A separate RAA can track Joe's usage of Node 1 over the same time periods. As shown, Joe did not use Node 1 during time period B and during time periods A, C, and D, Joe was using multiple nodes where only the processes performed by Node 1 are shown on the RAA. In this example, Joe is using 59% of Node 1 resources during time period A, 0% during time period B, 2% during time period C, and 62% during time period D.

Figure 7:
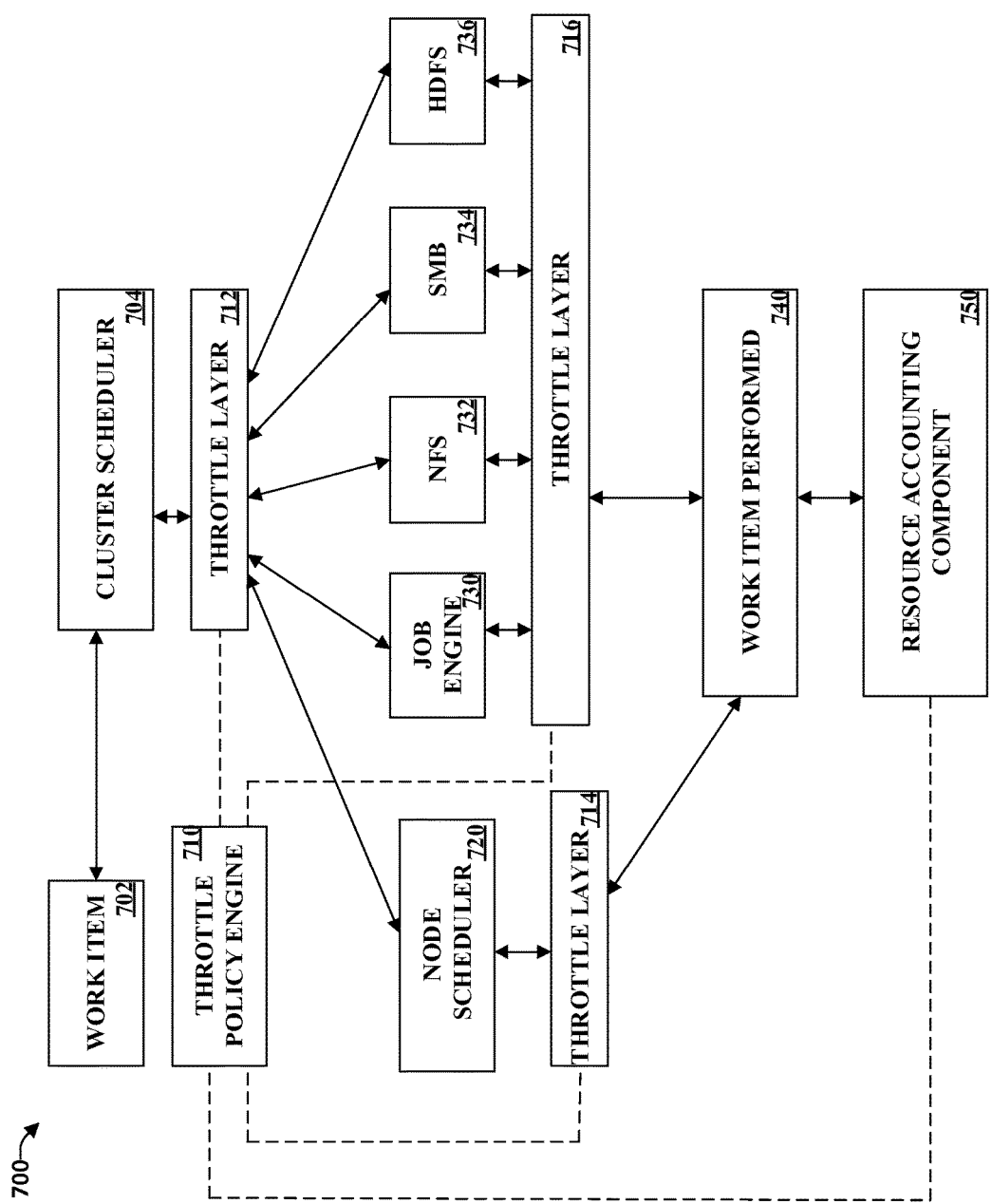
FIG. 7 illustrates an example block diagram of tiered throttle layers and a throttle policy engine in accordance with implementations of this disclosure.

Referring now to FIG. 7, there is illustrated an example block diagram of tiered throttle layers and a throttle policy engine in accordance with implementations of this disclosure.

When a work item is received the partitioned performance system can provide an estimate of the amount of resources required to process the work item. For example, if the work item is a read operation for a specific file, data within the resource accounting component 750 can be used to provide an estimate of the amount of CPU resources, memory resources, network resources, disk resources, etc. that will be required to process the work item. In one implementation, after the work item is processed, an accurate accounting is known for how much resources were actually consumed in processing the work item. Using the actual accountings, future estimates in the amount of resources processing a work item will require can be updated to reflect what we learned from previous transactions. Thus, it can be appreciated that the disclosed system can adaptively and more accurately predict the amount of resources a work item will consume when processed by learning from processing previous work items.

The cluster scheduler 704 can then determine whether the cluster has sufficient resources to process the work item by comparing the estimate of the amount of resources required to process the work item with an amount of spare resources the cluster currently has to process pending work items. An amount of cluster resource capacity can be determined by aggregating individual node capacity throughout the cluster of nodes. Therefore, as Nodes leave and/or join the cluster, the amount of cluster resources may change with the group change. A throttle policy engine 710 can establish a first throttle layer 712 at the cluster layer that throttles cluster resources to the work item based on any measurable criteria that can be aggregated from the RATs. For example, individual users can be limited to consuming no more than 10% of cluster resources, and the throttle policy engine 710, that is in communication with a resource accounting component 750, can determine whether the work item 702 is associated with a user whereby scheduling the work order to be processed would provide the user, and all other pending work items being processed by the user, with more than 10% of aggregate cluster resources. In the event it is determined that allowing the work item 702 to be processed would exceed the throttle limit, the throttle layer can prevent the work item from being scheduled until pending work items are processed and the user has excess capacity below their throttle limit to begin processing new work items.

A second throttle layer 716 can exist at the protocol head level. Cluster resources can be allocated to a plurality of protocols that are each served by a unique protocol head. One example is an NFS protocol head that receives all NFS protocol operations and schedules NFS work items to be processed. While the work item 702 passed the cluster level throttle layer 712 and was delivered to the associated protocol head, the protocol head may not have the resources available to process the work item immediately. For example, the NFS protocol head 732 may be limited by the throttle policy engine 710 to consuming 20% of cluster resources in processing NFS work items. If current NFS operations are already consuming 20% of cluster resources, the throttle layer 716 can hold work item 702 in a queue until enough resources are available, based on the resource estimate, to process work item 702 using the NFS protocol head's available resources. This process can be repeated at the other protocol heads such as SMB 734 and HDFS 736. The job engine 730 is generally responsible for internal file system processes such as replication processes, data services processes, restriping processes, etc., and can be given the same constraints as the protocol heads that serve direct client requests.

A third throttle layer 714 can exist at the node layer where a node scheduler 720 in conjunction with the throttle policy engine 710 and the node throttle layer 714 can work to limit the amount of resources consumed by an individual node. It can be appreciated that not all nodes are uniform in the amount of resources that are available, for example, some nodes may have different amounts of CPU power, memory space, disk space, etc. Thus, an individual node's resources and throttle limit are dependent upon the amount of resources the node has.

Unlike the protocol head throttle layer 716 and cluster throttle layer 712, there are other options to process work item 702. For example, if the node attempting to process the item is over the throttle limit the work item can be scheduled by a different node that does have the excess capacity to process the work item.

Eventually, once the work item is performed at 740, the resource accounting component can account for the resources consumed in processing the work item as described earlier in this specification.

In one example, throttle policy engine 710 could enforce a policy that a user can only use X % of cluster memory and Y % of protocol head CPU allocation. In another example, the job engine may be limited to consuming only 10% of cluster resources during peak hours and 80% of cluster resources during off-peak hours. In yet another example, the throttle policy engine could place absolute leases on cluster resources to specific users and/or protocols that can never be breached. However, in other examples, the lease may not be absolute. For example, an NFS protocol head may generally be allocated 40% of cluster resources; however, the remaining protocol heads may be currently inactive and have no pending activity. Thus, the NFS protocol head could be temporarily dynamically allocated the full set of cluster resources until work items begin to queue in the now dormant protocol heads. Thus, it can be appreciated that if resources are uncontested, then access to those resources may be temporarily unthrottled until contested again.

In one implementation, throttle policy engine 710 can be configured to achieve a global optimum workload mix in an attempt to maximize the efficiency of the cluster of nodes. For example, the throttle limits established at each layer of the distributed file system can be dynamically adjusted to create an optimum user experience. Continuing the example, through dynamic evaluation of the multiple factors that can be used to throttle the processing of resources, it may be determined that reducing the resources to one client or one set of work items may increase the throughput of a second set of work items in an amount greater than the first set was reduced. Thus, by reducing access to resources to the first set of work items, the total amount of work performed by the file system is increased. It can be appreciated that a sensitivity analysis can be trained on all measurable dimensions of the throttle policy engine to determine how much the overall file system is taxed or enhanced when each dimension is throttled or unthrottled.

FIG. 8-15 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 8:
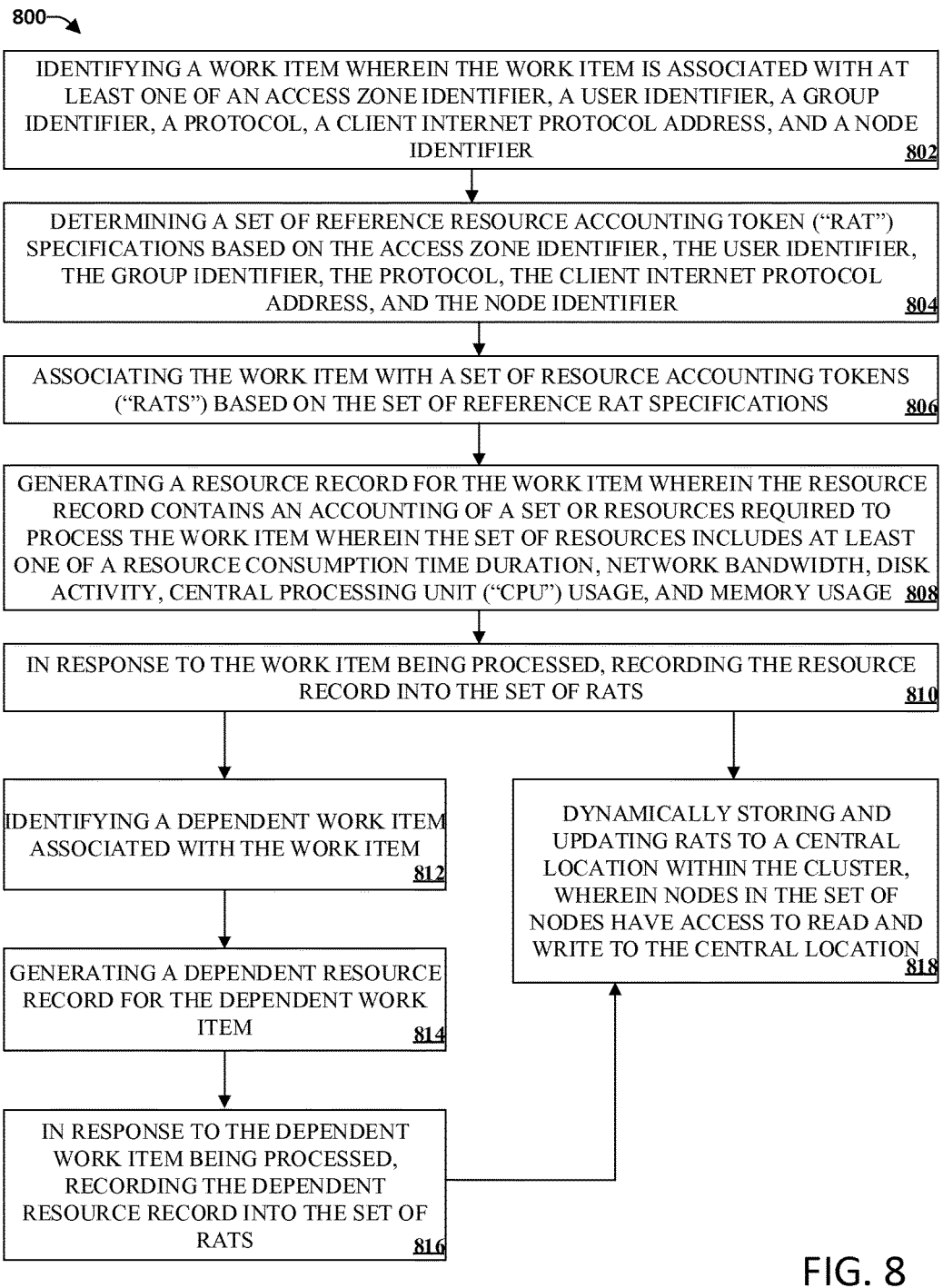
FIG. 8 illustrates an example flow diagram method for generating resource records for a work item and recording the resource records into a set of resource accounting tokens in accordance with implementations of this disclosure.

FIG. 8 illustrates an example flow diagram method for generating resource records for a work item and recording the resource records into a set of resource accounting tokens in accordance with implementations of this disclosure.

At 802, a work item can be identified where the work item is associated with at least an access zone identifier, a user identifier, a group identifier, a protocol, a client IP address, and a node identifier. In one implementation, the protocol is at least one of server message block, network file system, Hadoop distributed file system, file transfer protocol, object, hypertext transfer protocol, and a job engine of the distributed file system.

At 804, a reference RAT specification can be determined based on the access zone identifier, the user identifier, the group identifier, the protocol, the client IP address, and the node identifier. In one implementation, at 806, the work item can be associated with a set of RATs based on the reference RAT specification. At 808, a resource record can be generated for the work item, wherein the resource record contains an accounting of a set of resources required to process the work item, wherein the set of resources includes at least one of a resource consumption time duration, a network bandwidth, disk activity, CPU usage, and memory usage. In one implementation, the disk activity includes an indication of whether a disk cache was used to process the work item. In one implementation, network bandwidth includes a number of bytes sent, a number of bytes received, mbufs, mbuf clusters, and mbuf bytes. At 810, in response to the work item being processed, the resource record can be recorded into the set of RATs.

At 812, a dependent work item can be identified that is associated with the work item. For example, some work items when completed or in conjunction with being completed may spawn dependent work items that are processed as a part of the operation. Any dependent work items should be accounted to the same set of RATs as parent work item. At 814, a dependent resource record can be generated for the dependent work item. At 816, in response to the dependent work item being processed, the dependent resource record can be recorded into the set of RATs identified in step 806.

At 818, RATS can be dynamically stored and updated to a central location within the cluster of nodes, wherein nodes in the set of nodes have access to read and write to the central location.

Figure 9:
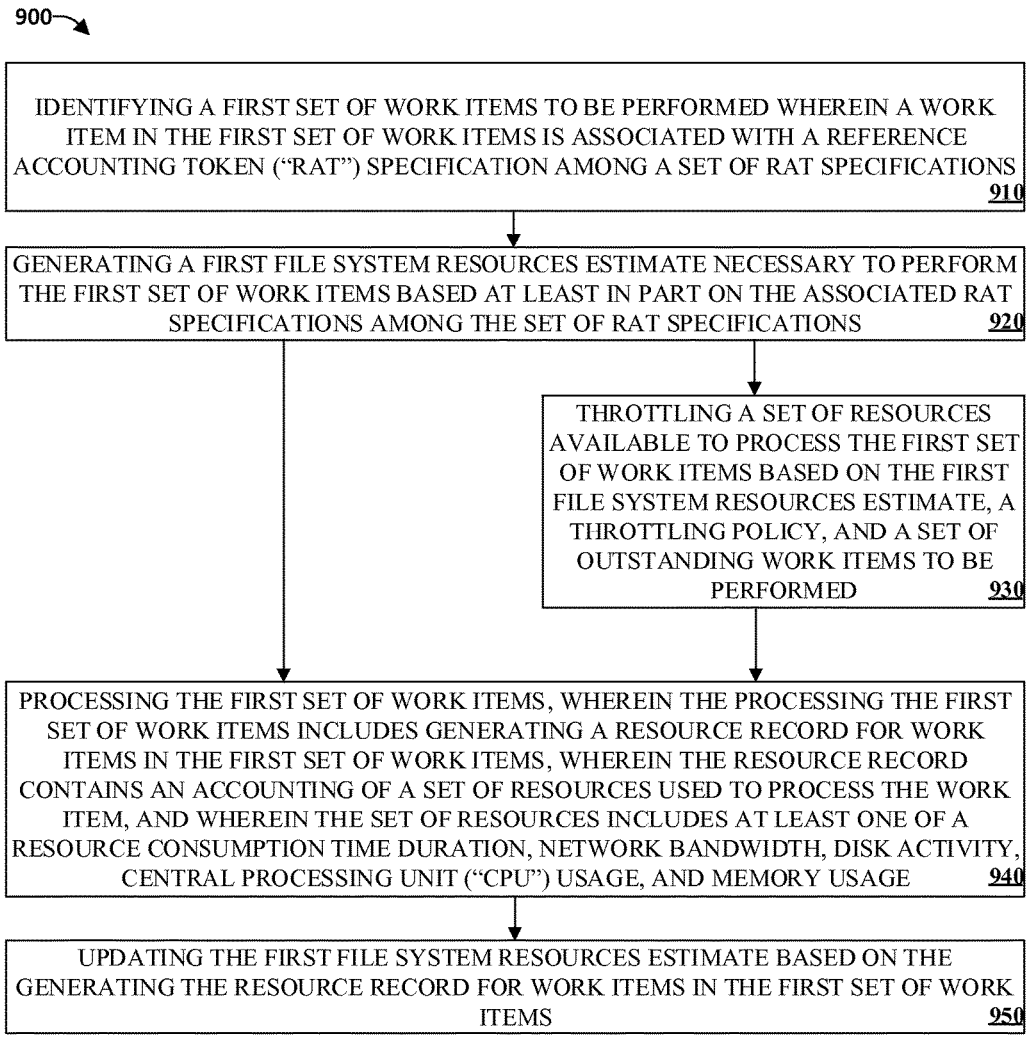
FIG. 9 illustrates an example flow diagram method for adaptively predicting the estimated impact of a first set of work items on file system resources in accordance with implementations of this disclosure.

FIG. 9 illustrates an example flow diagram method for adaptively predicting the estimated impact of a first set of work items on file system resources in accordance with implementations of this disclosure.

At 910, a first set of work items to be performed can be identified, wherein a work item in the first set of work items is associated with a RAT specification among a set of RAT specifications. At 920, a first file system resources estimate necessary to perform the first set of work items can be generated based at least in part on the associated RAT specifications among the set of RAT specifications.

At 930, a set of resources available to process the first set of work items can be throttled based on the first file system resources estimate, a throttling policy, and a set of outstanding work items to be performed. It can be appreciated that the throttling policy can be generated as described above with respect to FIG. 7.

At 940, the first set work items can be processed, wherein the processing the first set of work items includes generating a resource record for work items in the set of work items, wherein the resource record contains an accounting of a set resources used to process the work item, and wherein the set of resources includes at least one of a resource consumption time duration, network bandwidth, disk activity, CPU usage, and memory usage. At 950, the first file system resources estimate can be updated based on the generating the resource record for work items in the first set of work items.

Figure 10:
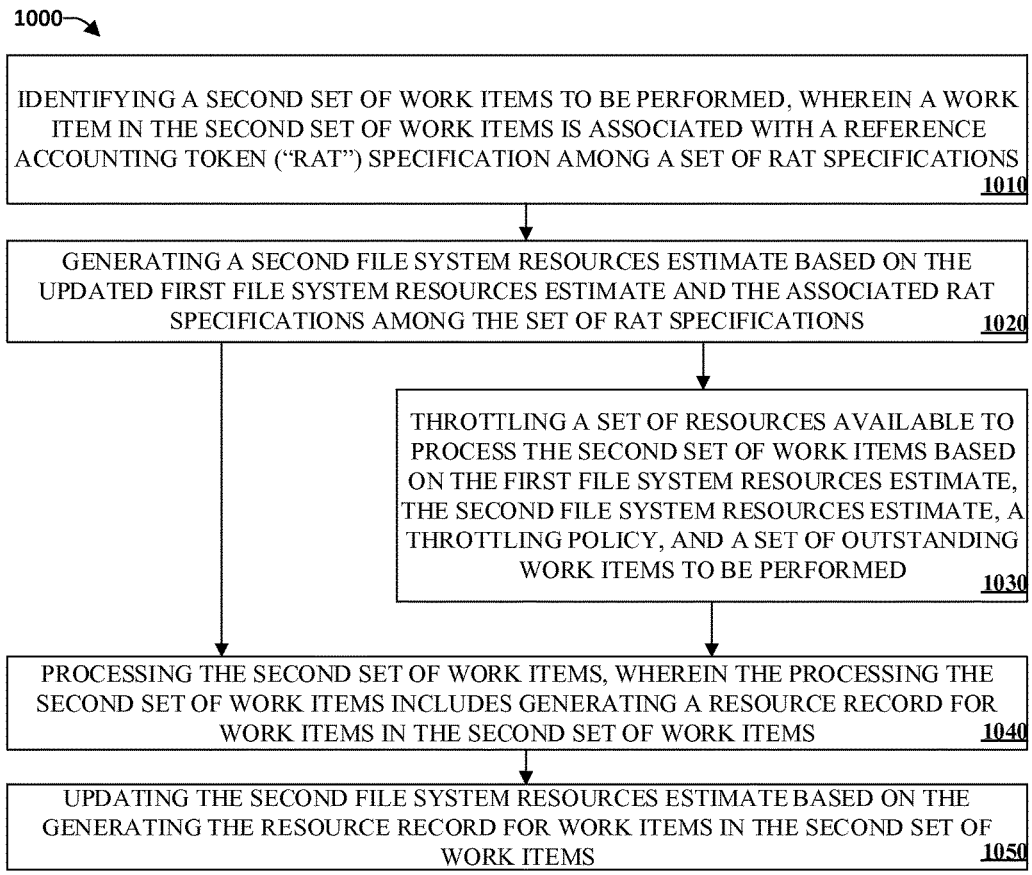
FIG. 10 illustrates an example flow diagram method for an example flow diagram method for adaptively predicting the estimated impact of a second set of work items on file system resources in accordance with implementations of this disclosure.

FIG. 10 illustrates an example flow diagram method for an example flow diagram method for adaptively predicting the estimated impact of a second set of work items on file system resources in accordance with implementations of this disclosure. It can be appreciated that FIG. 10, in one implementation, represents a continuation from the method described with respect to FIG. 9.

At 1010, a second set of work items to be performed can be identified, wherein a work item in the second set of work items is associated with a reference RAT specification among a set of RAT specifications. At 1020, a second file system resources estimate can be generated based on the updated first file system resources estimate and the associated RAT specifications among the set of RAT specifications.

At 1030, a set of resources available to process the second set of work items can be throttled based on the first file system resources estimate, the second file system resources estimate, a throttling policy, and a set of outstanding work items to be performed.

At 1040, the second set of work items can be processed, wherein the processing the second set of work items includes generating a resource record for work items in the second set of work items. At 1050, the second file system resources estimate can be updated based on the generating the resource record for work items in the second set of resources.

Figure 11:
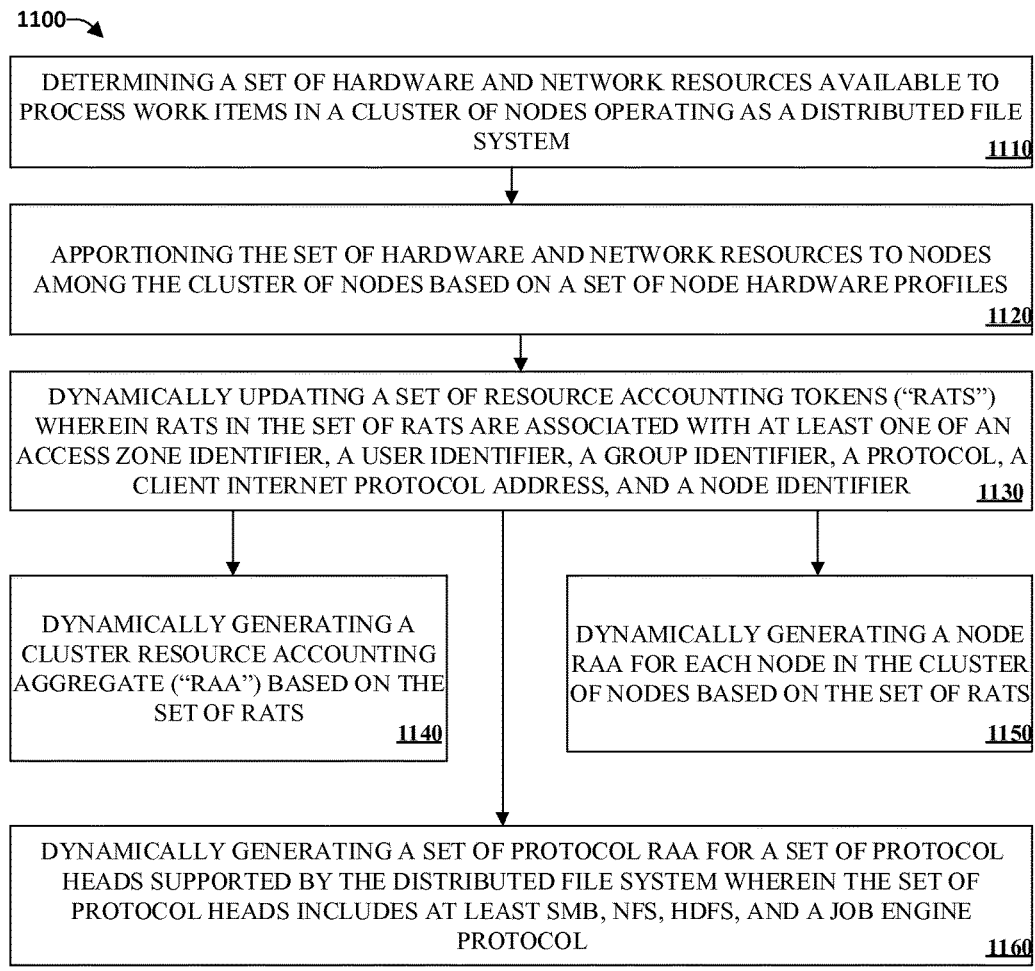
FIG. 11 illustrates an example flow diagram method for determining a set of resource accounting aggregates associated with the cluster, a set of nodes, and a set of protocol heads in accordance with implementations of this disclosure.

FIG. 11 illustrates an example flow diagram method for determining a set of resource accounting aggregates associated with the cluster, a set of nodes, and a set of protocol heads in accordance with implementations of this disclosure.

At 1110, a set of hardware and network resources available to process work items in a cluster of nodes operating as a distributed file system can be determined. In one implementation, each node in the cluster of nodes can be profiled to determine the nodes resources and then all nodes in the cluster of nodes can be aggregated to determine the total resources available to the cluster. It can be appreciated that as nodes join and leave the cluster, the amount of resources available to the cluster will change. In one implementation, the amount of resources can be dynamically updated based on changes to node configurations among the cluster.

At 1120, the set of hardware and network resources can be apportioned among the cluster of nodes based on a set of node hardware profiles. At 1130, the set of RATs can be dynamically updated, wherein RATs in the set of RATs are associated with at least one of an access zone identifier, a user identifier, a group identifier, a protocol, a client IP address and a node identifier.

At 1140, a cluster RAA can be dynamically generated based on the set of RATs.

At 1150, a node RAA can be dynamically generated based on the set of RATs.

At 1160, a set of protocol RAA for a set of protocol heads can be dynamically generated based on the set of RATs wherein the set of protocol heads includes at least SMB, NFS, HDFS and a Job Engine protocol.

Figure 12:
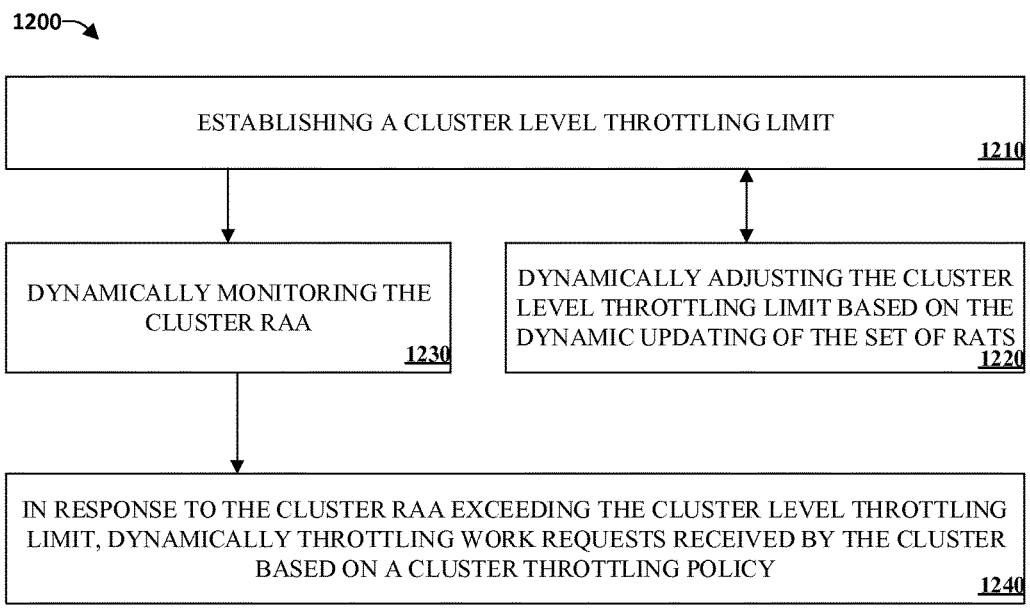
FIG. 12 illustrates an example flow diagram method for establishing and dynamically adjusting a cluster level throttling limit in accordance with implementations of this disclosure.

FIG. 12 illustrates an example flow diagram method for establishing and dynamically adjusting a cluster level throttling limit in accordance with implementations of this disclosure.

At 1210, a cluster level throttling limit can be established. At 1220, the cluster level throttling limit can be dynamically adjusted based on the dynamic updating of the set of RATs. At 1230, the cluster RAA can be dynamically monitored. At 1240, in response to the cluster RAA exceeding the cluster level throttling limit, dynamically throttling work requests received by the cluster based on a cluster throttling policy.

Figure 13:
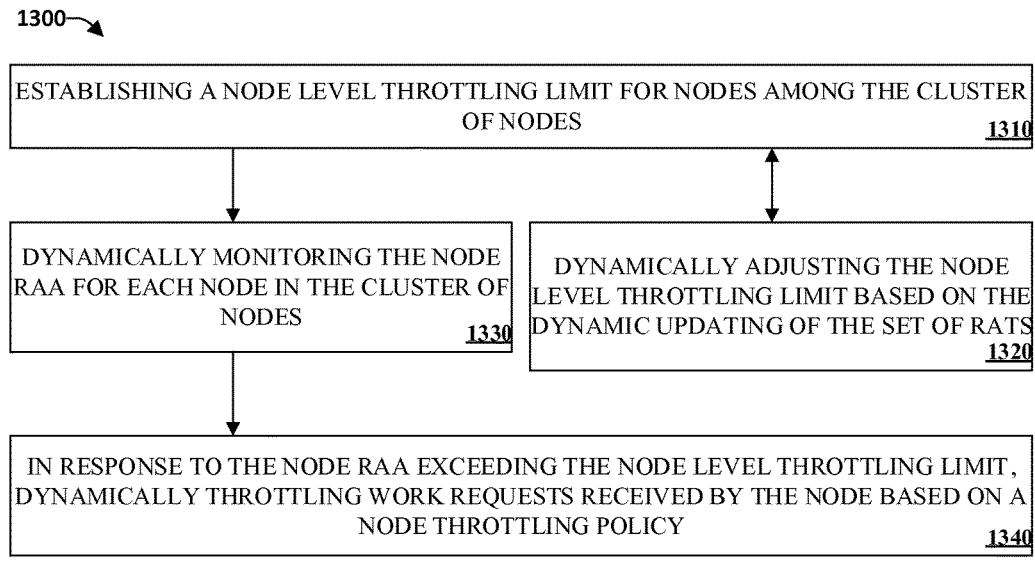
FIG. 13 illustrates an example flow diagram method for establishing and dynamically adjusting a node level throttling limit in accordance with implementations of this disclosure.

FIG. 13 illustrates an example flow diagram method for establishing and dynamically adjusting a node level throttling limit in accordance with implementations of this disclosure.

At 1310, a node level throttling limit can be established for nodes among the cluster of nodes. At 1320, the node level throttling limit can be dynamically adjusted based on the dynamic updating of the set of RATs. At 1330, the node RAA for each node in the cluster of nodes can be dynamically monitored. At 1340, in response to any node RAA exceeding the respective node level throttling limit for the node, dynamically throttling work requests received by that node based on a node throttling policy. In some implementations, the throttling policy can account for nodes joining and leaving the cluster as well as clients starting and stopping communication to multiple nodes.

Figure 14:
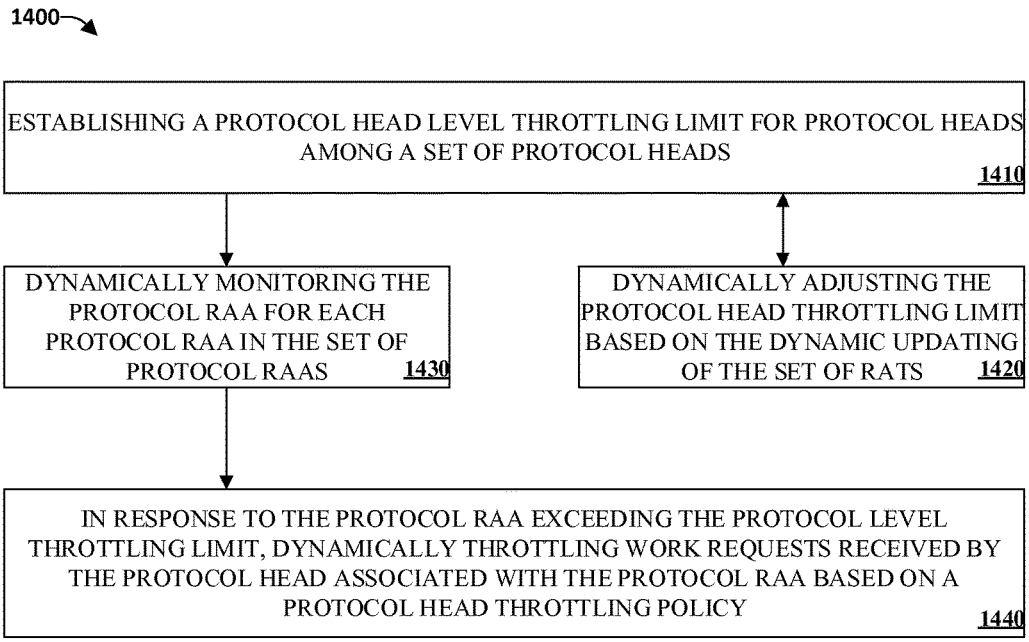
FIG. 14 illustrates an example flow diagram method for establishing and dynamically adjusting a protocol head level throttling limit in accordance with implementations of this disclosure.

FIG. 14 illustrates an example flow diagram method for establishing and dynamically adjusting a protocol head level throttling limit in accordance with implementations of this disclosure.

At 1410, a protocol head level throttling limit can be established for protocol heads among a set of protocol heads. At 1420, protocol head level throttling limits among the set of protocol head level throttling limits can be dynamically adjusted based on the dynamic updating of the set of RATs. At 1430, the protocol RAA for each RAA in the set of protocol RAA can be dynamically monitored. At 1440, in response to the protocol RAA exceeding the protocol level throttling limit, dynamically throttling work requests received by the protocol head associated with the protocol RAA based on a protocol head throttling policy. In some implementations, the throttling policy can account for nodes joining and leaving the cluster as well as clients starting and stopping communication to multiple protocol heads.

Figure 15:
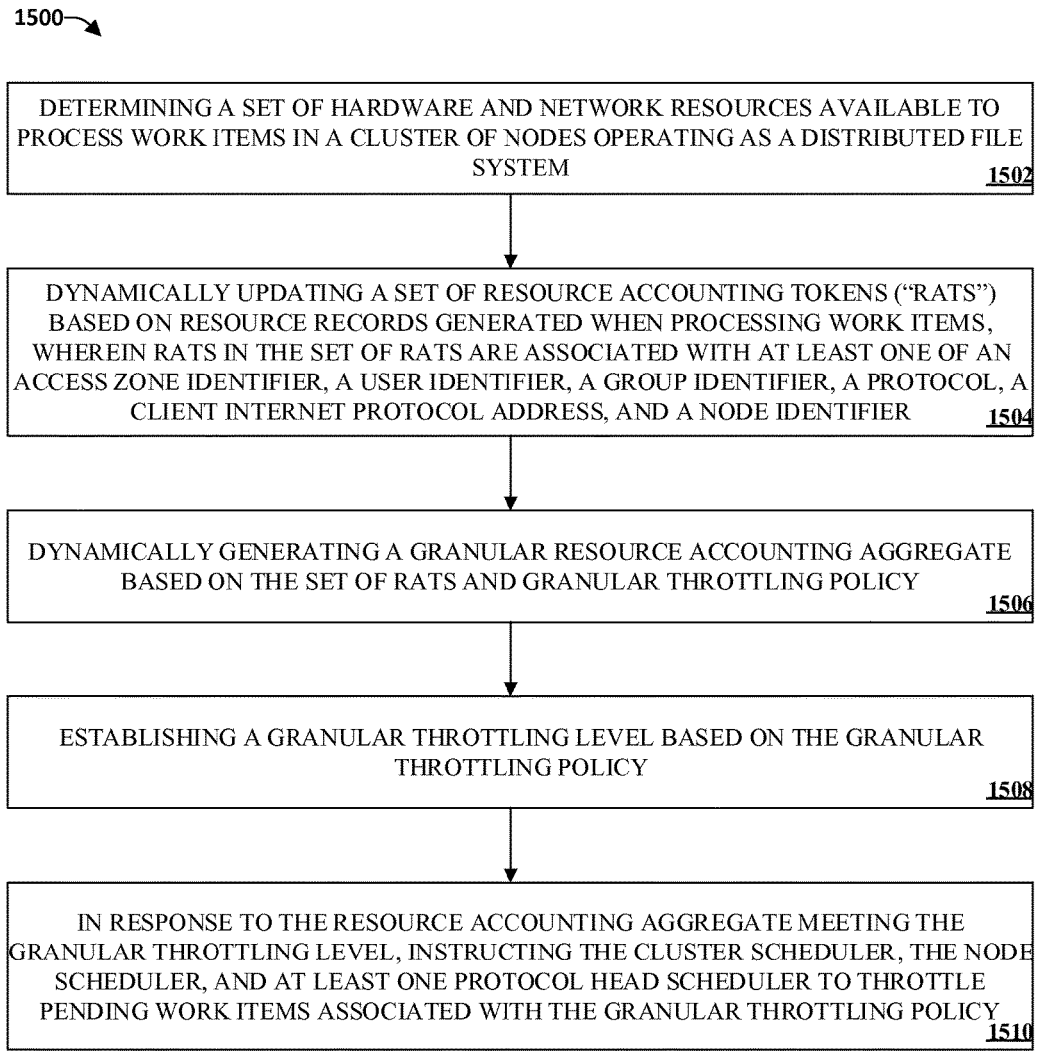
FIG. 15 illustrates an example flow diagram method for using resource account aggregates to throttle at the granular level in accordance with implementations of this disclosure.

FIG. 15 illustrates an example flow diagram method for using resource account aggregates to throttle work item processing at a granular level.

At 1502, a set of hardware and network resources available to process work items in a cluster of nodes operating as a distributed file system can be determined.

At 1504, a set of resource accounting tokens can be dynamically updated based on resource records generated when processing work items, wherein resource accounting tokens in the set of resource accounting tokens are associated with at least one of an access zone identifier, a user identifier, a group identifier, a protocol, a client internet protocol address, and a node identifier.

At 1506, a granular resource accounting aggregate can be dynamically generated based on the set of resource accounting tokens and a granular throttling policy.

At 1508, a granular throttling level can be established based on the granular throttling policy. In one implementation, the granular throttling policy can be based on a unique user identifier. For example, cluster resources allowed to be consumed by an individual user can be throttled based on the user reaching and/or exceeding the granular throttling level applicable to the user. In one implementation, the granular throttling policy can be based on a group identifier. For example, cluster resources allowed to be consumed by any member of the group can be throttled based on the group as an aggregate reaching and/or exceeding the granular throttling level applicable to the group. In one implementation, the granular throttling policy can be based on a client internet protocol address. In one implementation, the granular throttling policy can be based on a unique file and/or directory. For example, if an amount of cluster resources allowed to be consumed by any client or job from the job engine associated with a single file or directory reaches or exceeds a per file throttling level, any client attempting to perform an operation on that file may be throttled.

At 1510, in response to the resource accounting aggregate meeting the granular throttling level, instructing the cluster scheduler, at least one node scheduler, and at least one protocol head scheduler to throttle pending work items associated with the granular throttling policy.

Figure 16:
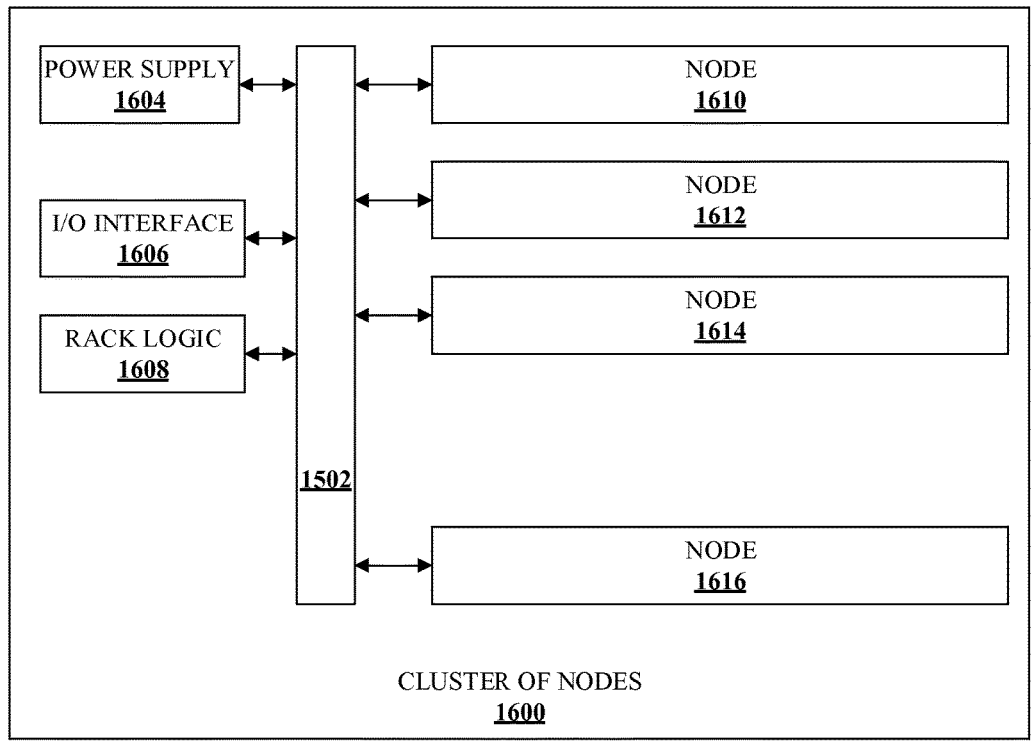
FIG. 16 illustrates an example block diagram of a rack of a cluster of nodes in accordance with implementations of this disclosure.

FIG. 16 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 1610, 1612, 1614 and 1616 operating in a cluster; however, it can be appreciated that more or fewer nodes can make up a cluster. It can be further appreciated that nodes among the cluster of nodes do not have to be in a same enclosure as shown for ease of explanation in FIG. 16, and can be geographically disparate. Backplane 1602 can be any type of commercially available networking infrastructure that allows nodes among the cluster of nodes to communicate amongst each other in as close to real time as the networking infrastructure allows. It can be appreciated that the backplane 1602 can also have a separate power supply, logic, I/O, etc. as necessary to support communication amongst nodes of the cluster of nodes.

As shown in the figure, enclosure 1600 contains at least a power supply 1604, an input/output interface 1606, rack logic 1608, several nodes 1610, 1612, 1614, and 1616, and backplane 1602. Power supply 1604 provides power to each component and nodes within the enclosure. The input/output interface 1606 provides internal and external communication for components and nodes within the enclosure. Backplane 1608 can enable passive and active communication of power, logic, input signals, and output signals for each node.

It can be appreciated that the Cluster of nodes 1600 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 17:
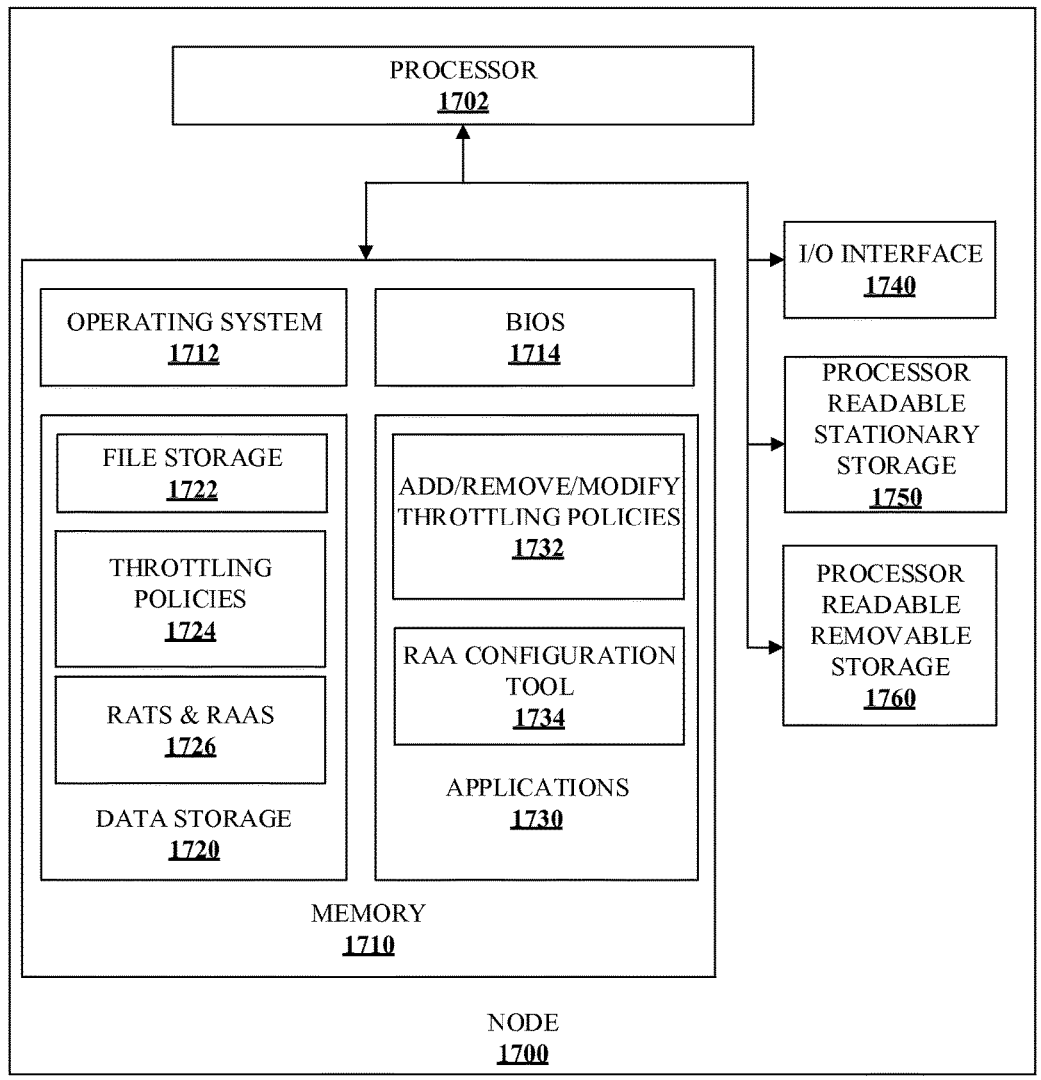
FIG. 17 illustrates an example block diagram of a node in accordance with implementations of this disclosure.

FIG. 17 illustrates an example block diagram of a node 1700 in accordance with implementations of this disclosure. As shown in FIG. 16, a plurality of nodes may be included in one enclosure that shares resources provided by the enclosure to reduce size, power, and cost.

Node 1700 includes processor 1702 which communicates with memory 1710 via a bus. Node 1700 also includes input/output interface 1740, processor-readable stationary storage device(s) 1750, and processor-readable removable storage device(s) 1760. Input/output interface 1740 can enable node 1700 to communicate with other nodes, mobile devices, network devices, and the like. Processor-readable stationary storage device 1750 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1760 enables processor 1702 to read non-transitive storage media for storing and accessing processor-readable instructions, modules, data structures, and other forms of data. The non-transitive storage media may include Flash drives, tape media, floppy media, disc media, and the like.

Memory 1710 may include Random Access Memory (RAM), Read-Only Memory (ROM), hybrid of RAM and ROM, and the like. As shown, memory 1710 includes operating system 1712 and basic input/output system (BIOS) 1714 for enabling the operation of node 1700. In various embodiments, a general-purpose operating system may be employed such as a version of UNIX, LINUX™, a specialized server operating system such as Microsoft's Windows Server™ and Apple Computer's OS X, or the like.

Applications 1730 may include processor executable instructions which, when executed by node 1700, transmit, receive, and/or otherwise process messages, audio, video, and enable communication with other networked computing devices. Examples of application programs include database servers, file servers, calendars, transcoders, and so forth. Applications 1730 may include, for example, resource accounting aggregate configuration tool 1734 that can allow an administrator to customize an RAA for data collection and/or throttling purposes according to implementations of this disclosure. Add/remove/modify throttling policies application 1732 can also be present that allows an administrator to establish custom throttling policies according to implementations of this disclosure. It can be appreciated that a UI for such applications can exist, such as within a web UI for the distributed file system as a whole.

Human interface components (not pictured), may be remotely associated with node 1700, which can enable remote input to and/or output from node 1700. For example, information to a display or from a keyboard can be routed through the input/output interface 1740 to appropriate peripheral human interface components that are remotely located. Examples of peripheral human interface components include, but are not limited to, an audio interface, a display, keypad, pointing device, touch interface, and the like.

Data storage 1720 may reside within memory 1710 as well, storing file storage 1722 data such as metadata or LIN data and throttling policies 1724 as disclosed herein, and resource accounting tokens and resource accounting aggregates 1726 that can be dynamically updated by implementations disclosed herein. It can be appreciated that LIN data and/or metadata can relate to file storage within processor readable stationary storage 1750 and/or processor readable removable storage 1760. For example, LIN data may be cached in memory 1710 for faster or more efficient frequent access versus being stored within processor readable stationary storage 1750. It can also be appreciated that RATS and RAAS 1726 can also be stored within cache memory for faster access and modification by implementations of this disclosure. RATS and RAAS 1726 can also be mirrored across other nodes for local access that does not create backend 10 according to implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    determining a set of hardware and network resources available to process work items in a cluster of nodes operating as a distributed file system;
    apportioning the set of hardware and network resources to nodes among the cluster of nodes based on a set of node hardware profiles;
    generating a set of resource accounting tokens ("RATs") wherein RATs in the set of RATs are associated with an access zone identifier of the distributed file system, a user identifier of the distributed file system, a group identifier of the distributed file system, a protocol of the distributed file system, a client internet protocol address, and a node identifier of the cluster of nodes;
    processing work items of the distributed file system by nodes of the cluster of nodes;
    in response to processing work items, dynamically updating the set of RATs;
    dynamically generating a cluster resource accounting aggregate ("RAA") based on the set of RATs;
    dynamically generating a node RAA for each node in the cluster of nodes based on the set of RATs; and
    dynamically generating a set of protocol RAA for a set of protocol heads supported by the distributed file system wherein the set of protocol heads includes at least Server Message Block (SMB), Network File System (NFS), Hadoop Distributed File System (HDFS), and a Job Engine protocol.

2. The method of claim 1, further comprising:
    establishing a cluster level throttling limit;
    dynamically monitoring the cluster RAA; and
    in response to the cluster RAA exceeding the cluster level throttling limit, dynamically throttling work requests received by the cluster based on a cluster throttling policy.

3. The method of claim 2, further comprising:
    establishing a node level throttling limit for nodes among the cluster of nodes;
    dynamically monitoring the node RAA for each node in the cluster of nodes; and in response to the node RAA exceeding the node level throttling limit, dynamically throttling work requests received by the node based on a node throttling policy.

4. The method of claim 3, further comprising:
establishing a protocol head level throttling limit for nodes among the cluster of nodes;
dynamically monitoring the protocol RAA for each protocol RAA in the set of protocol RAAs; and
in response to the protocol RAA exceeding the protocol level throttling limit, dynamically throttling work requests received by the protocol head associated with the protocol RAA based on a protocol head throttling policy.

5. The method of claim 4, further comprising:
dynamically adjusting at least one of the cluster level throttling limit, the node level throttling limit, and the protocol head throttling limit based on the dynamic updating the set of RATs.

6. A system comprising at least one storage device and at least one hardware processor configured to:
determine a set of hardware and network resources available to process work items in a cluster of nodes operating as a distributed file system;
apportion the set of hardware and network resources to nodes among the cluster of nodes based on a set of node hardware profiles;
generate a set of resource accounting tokens ("RATs") wherein RATs in the set of RATs are associated with an access zone identifier of the distributed file system, a user identifier of the distributed file system, a group identifier of the distributed file system, a protocol of the distributed file system, a client internet protocol address, and a node identifier of the cluster of nodes;
process work items of the distributed file system by nodes of the cluster of nodes;
in response to processing work items, dynamically update the set of RATs;
dynamically generate a cluster resource accounting aggregate ("RAA") based on the set of RATs;
dynamically generate a node RAA for each node in the cluster of nodes based on the set of RATs; and
dynamically generate a set of protocol RAA for a set of protocol heads supported by the distributed file system wherein the set of protocol heads includes at least Server Message Block (SMB), Network File System (NFS), Hadoop Distributed File System (HDFS), and a Job Engine protocol.

7. The system of claim 6 further configured to:
establish a cluster level throttling limit;
dynamically monitor the cluster RAA; and
in response to the cluster RAA exceeding the cluster level throttling limit, dynamically throttle work requests received by the cluster based on a cluster throttling policy.

8. The system of claim 7 further configured to:
establish a node level throttling limit for nodes among the cluster of nodes;
dynamically monitor the node RAA for each node in the cluster of nodes; and
in response to the node RAA exceeding the node level throttling limit, dynamically throttle work requests received by the node based on a node throttling policy.

9. The system of claim 8 further configured to:
establish a protocol head level throttling limit for nodes among the cluster of nodes;
dynamically monitoring the protocol RAA for each protocol RAA in the set of protocol RAAs; and
in response to the protocol RAA exceeding the protocol level throttling limit, dynamically throttle work requests received by the protocol head associated with the protocol RAA based on a protocol head throttling policy.

10. The system of claim 9 further configured to:
dynamically adjust at least one of the cluster level throttling limit, the node level throttling limit, and the protocol head throttling limit based on the dynamic updating the set of RATs.

11. A non-transitory computer readable medium with program instructions stored thereon to perform the following acts:
determining a set of hardware and network resources available to process work items in a cluster of nodes operating as a distributed file system;
apportioning the set of hardware and network resources to nodes among the cluster of nodes based on a set of node hardware profiles;
generating a set of resource accounting tokens ("RATs") wherein RATs in the set of RATs are associated with an access zone identifier of the distributed file system, a user identifier of the distributed file system, a group identifier of the distributed file system, a protocol of the distributed file system, a client internet protocol address, and a node identifier of the cluster of nodes;
processing work items of the distributed file system by nodes of the cluster of nodes;
in response to processing work items, dynamically updating the set of RATs;
dynamically generating a cluster resource accounting aggregate ("RAA") based on the set of RATs;
dynamically generating a node RAA for each node in the cluster of nodes based on the set of RATs; and
dynamically generating a set of protocol RAA for a set of protocol heads supported by the distributed file system wherein the set of protocol heads includes at least Server Message Block (SMB), Network File System (NFS), Hadoop Distributed File System (HDFS), and a Job Engine protocol.

12. The non-transitory computer readable medium of claim 11, with program instructions stored thereon to further perform the following acts:
establishing a cluster level throttling limit;
dynamically monitoring the cluster RAA; and
in response to the cluster RAA exceeding the cluster level throttling limit, dynamically throttling work requests received by the cluster based on a cluster throttling policy.

13. The non-transitory computer readable medium of claim 12, with program instructions stored thereon to further perform the following acts:
establishing a node level throttling limit for nodes among the cluster of nodes;
dynamically monitoring the node RAA for each node in the cluster of nodes; and
in response to the node RAA exceeding the node level throttling limit, dynamically throttling work requests received by the node based on a node throttling policy.

14. The non-transitory computer readable medium of claim 13, with program instructions stored thereon to further perform the following acts:
establishing a protocol head level throttling limit for nodes among the cluster of nodes;
dynamically monitoring the protocol RAA for each protocol RAA in the set of protocol RAAs; and in response to the protocol RAA exceeding the protocol level throttling limit, dynamically throttling work requests received by the protocol head associated with the protocol RAA based on a protocol head throttling policy.

15. The non-transitory computer readable medium of claim 14, with program instructions stored thereon to further perform the following acts:

dynamically adjusting at least one of the cluster level throttling limit, the node level throttling limit, and the protocol head throttling limit based on the dynamic updating the set of RATs.

* * * * *